(12) United States Patent
Lu et al.

(10) Patent No.: US 10,153,001 B2
(45) Date of Patent: *Dec. 11, 2018

(54) VIDEO SKIMMING METHODS AND SYSTEMS

(71) Applicant: Vid Scale, Inc., Wilmington, DE (US)

(72) Inventors: Taoran Lu, Santa Clara, CA (US);
Zheng Yuan, San Jose, CA (US); Yu Huang, Sunnyvale, CA (US); Dapeng Oliver Wu, Gainesville, FL (US); Hong Heather Wu, West Windsor, NJ (US)

(73) Assignee: Vid Scale, Inc., Wilmington, DE (US)

( * ) Notice: Subject to any disclaimer, the term of this patent is extended or adjusted under 35 U.S.C. 154(b) by 481 days.

This patent is subject to a terminal disclaimer.

(21) Appl. No.: 14/922,936

(22) Filed: Oct. 26, 2015

(65) Prior Publication Data

US 2016/0111130 A1     Apr. 21, 2016

Related U.S. Application Data

(63) Continuation of application No. 13/103,810, filed on May 9, 2011, now Pat. No. 9,171,578.

(Continued)

(51) Int. Cl.
*G06K 9/62* (2006.01)
*G11B 27/031* (2006.01)
(Continued)

(52) U.S. Cl.
CPC ........ *G11B 27/031* (2013.01); *G06K 9/00751* (2013.01); *G11B 27/034* (2013.01); *G11B 27/28* (2013.01)

(58) Field of Classification Search
None
See application file for complete search history.

(56) References Cited

U.S. PATENT DOCUMENTS 5,485,611 A   1/1996  Astle
5,521,841 A * 5/1996  Arman ................. G06F 3/0485
                                                        345/589

(Continued)

FOREIGN PATENT DOCUMENTS

KR      20030054352 A  *  7/2003

OTHER PUBLICATIONS

A user attention model—Summarization, Yu-Fei Ma et al., ACM, 1-58113-620, 2002, pp. 533-542.*

(Continued)

*Primary Examiner* — Jayesh A Patel
(74) *Attorney, Agent, or Firm* — Invention Mine LLC

(57) ABSTRACT

In an embodiment, a method of creating a skimming preview of a video includes electronically receiving a plurality of video shots, analyzing each frame in a video shot from the plurality of video shots, where analyzing includes determining a saliency of each frame of the video shot. The method also includes determining a key frame of the video shot based on the saliency of each frame the video shot, extracting visual features from the key frame, performing shot clustering of the plurality of video shots to determine concept patterns based on the visual features, and generating a reconstruction reference tree based on the shot clustering. The reconstruction reference tree includes video shots categorized according to each concept pattern.

24 Claims, 9 Drawing Sheets

Related U.S. Application Data

(60) Provisional application No. 61/371,458, filed on Aug. 6, 2010.

(51) Int. Cl.
  *G11B 27/034* (2006.01)
  *G11B 27/28* (2006.01)
  *G06K 9/00* (2006.01)

(56) References Cited

U.S. PATENT DOCUMENTS

| | | | |
|---|---|---|---|
| 5,635,982 A | 6/1997 | Zhang et al. | |
| 5,664,227 A * | 9/1997 | Mauldin | G06F 17/30796 |
| | | | 707/E17.028 |
| 5,708,767 A | 1/1998 | Yea et al. | |
| 5,828,809 A | 10/1998 | Chang et al. | |
| 5,956,026 A * | 9/1999 | Ratakonda | G06F 17/30802 |
| | | | 348/E5.067 |
| 6,331,859 B1 * | 12/2001 | Crinon | G06F 17/30799 |
| | | | 345/619 |
| 6,340,971 B1 | 1/2002 | Janse et al. | |
| 6,342,904 B1 | 1/2002 | Vasudevan et al. | |
| 6,473,095 B1 | 10/2002 | Martino et al. | |
| 6,492,998 B1 | 12/2002 | Kim et al. | |
| 6,535,639 B1 | 3/2003 | Uchihachi et al. | |
| 6,549,643 B1 | 4/2003 | Toklu et al. | |
| 6,616,529 B1 | 9/2003 | Qian et al. | |
| 6,642,940 B1 | 11/2003 | Dakss et al. | |
| 6,690,725 B1 | 2/2004 | Abdeljaoud et al. | |
| 6,697,523 B1 | 2/2004 | Divakaran et al. | |
| 6,721,454 B1 | 4/2004 | Qian et al. | |
| 6,748,158 B1 | 6/2004 | Jasinschi et al. | |
| 6,771,268 B1 | 8/2004 | Crinon | |
| 6,807,361 B1 | 10/2004 | Girgensohn et al. | |
| 6,956,573 B1 | 10/2005 | Bergen et al. | |
| 6,964,021 B2 * | 11/2005 | Jun | G06F 17/30787 |
| | | | 707/E17.028 |
| 7,035,435 B2 | 4/2006 | Li et al. | |
| 7,120,873 B2 | 10/2006 | Li | |
| 7,131,059 B2 | 10/2006 | Obrador | |
| 7,151,852 B2 | 12/2006 | Gong et al. | |
| 7,158,676 B1 * | 1/2007 | Rainsford | H04N 7/17318 |
| | | | 348/700 |
| 7,212,666 B2 | 5/2007 | Zhang et al. | |
| 7,222,300 B2 | 5/2007 | Toyama et al. | |
| 7,263,660 B2 | 8/2007 | Zhang et al. | |
| 7,296,231 B2 | 11/2007 | Loui et al. | |
| 7,318,104 B1 | 1/2008 | Lee et al. | |
| 7,474,698 B2 | 1/2009 | Pan et al. | |
| 7,606,462 B2 | 10/2009 | Hosoda et al. | |
| 7,653,530 B2 | 1/2010 | Carter et al. | |
| 7,773,813 B2 | 8/2010 | Hua et al. | |
| 7,904,455 B2 | 3/2011 | Chiu et al. | |
| 7,979,435 B2 | 7/2011 | Oisel et al. | |
| 7,986,372 B2 | 7/2011 | Ma et al. | |
| 8,028,234 B2 | 9/2011 | Li | |
| 8,280,158 B2 | 10/2012 | Adcock et al. | |
| 8,311,277 B2 | 11/2012 | Peleg et al. | |
| 8,316,301 B2 | 11/2012 | Kim et al. | |
| 8,363,960 B2 | 1/2013 | Petersohn | |
| 8,493,448 B2 * | 7/2013 | Burazerovic | H04N 13/261 |
| | | | 348/157 |
| 8,515,258 B2 | 8/2013 | Chaudhuri et al. | |
| 8,571,330 B2 | 10/2013 | Gao et al. | |
| 9,171,578 B2 * | 10/2015 | Lu | G11B 27/034 |
| 2001/0016007 A1 | 8/2001 | Wu et al. | |
| 2002/0157116 A1 | 10/2002 | Jasinschi | |
| 2003/0007555 A1 | 1/2003 | Divakaran et al. | |
| 2003/0184579 A1 | 10/2003 | Zhang et al. | |
| 2003/0210886 A1 * | 11/2003 | Li | G06F 17/30793 |
| | | | 386/241 |
| 2003/0218696 A1 | 11/2003 | Bagga et al. | |
| 2003/0234772 A1 | 12/2003 | Zhang et al. | |
| 2003/0234805 A1 * | 12/2003 | Toyama | G06F 3/0481 |
| | | | 715/723 |
| 2004/0125124 A1 | 7/2004 | Kim et al. | |
| 2004/0170321 A1 | 9/2004 | Gong et al. | |
| 2005/0228849 A1 | 10/2005 | Zhang | |
| 2006/0106816 A1 | 5/2006 | Oisel et al. | |
| 2006/0221084 A1 | 10/2006 | Yeung et al. | |
| 2007/0101269 A1 * | 5/2007 | Hua | G06F 17/30811 |
| | | | 715/723 |
| 2007/0124752 A1 | 5/2007 | Sakai | |
| 2007/0263128 A1 | 11/2007 | Zhang | |
| 2008/0112684 A1 * | 5/2008 | Matsushita | G06F 17/30802 |
| | | | 386/278 |
| 2008/0127270 A1 | 5/2008 | Shipman et al. | |
| 2008/0184120 A1 | 7/2008 | O'Brien-Strain et al. | |
| 2009/0083790 A1 * | 3/2009 | Wang | G06K 9/00751 |
| | | | 725/38 |
| 2011/0064318 A1 | 3/2011 | Gao et al. | |
| 2011/0081075 A1 | 4/2011 | Adcock et al. | |
| 2011/0305439 A1 | 12/2011 | Chaudhuri et al. | |
| 2012/0033949 A1 | 2/2012 | Lu et al. | |
| 2012/0123780 A1 | 5/2012 | Gao et al. | |
| 2013/0282747 A1 * | 10/2013 | Cheng | G06F 17/30023 |
| | | | 707/758 |
| 2015/0143239 A1 * | 5/2015 | Birkbeck | G06F 3/0484 |
| | | | 715/716 |

OTHER PUBLICATIONS

Bay, H., et al., "SURF: Speeded Up Robust Features," Computer Vision and Image Understanding (CVIU), vol. 110, No. 3, Jun. 2008, pp. 346-359.

Csurka, G., et al., "Visual Categorization with Bags of Keypoints," Proceedings of ECCV International Workshop on Statistical Learning in Computer Vision, 2004, 16 pgs.

Evangelopoulos, G., et al., "Video Event Detection and Summarization Using Audio, Visual and Text Saliency," IEEE ICASSP, Apr. 2009, pp. 3553-3556.

Fei-Fei, L., et al., "A Bayesian Hierarchical Model for Learning Natural Scene Categories," IEEE Computer Vision and Pattern Recognition, Jun. 2005, pp. 524-531.

Gong, Y., et al., "Video Summarization Using Singular Value Decomposition," Proceedings International Conference on Computer Vision Pattern Recognition, vol. 2, Jun. 2000, pp. 174-180.

Gribonval, R., et al., "Harmonic Decomposition of Audio Signals with Matching Pursuit," IEEE Transactions on Signal Processing, vol. 51, No. 1, Jan. 2003, 9 pgs.

Hua, X., et al., "AVE—Automated Home Video Editing," ACM Multimedia, Nov. 2003, pp. 490-497.

Leibe, B., et al., "Robust Object Detection with Interleaved Categorization and Segmentation," IJCV Special Issue on Learning for Vision and Vision for Learning, Sep. 2005, 2nd Revised Version Aug. 2007, 26 pgs.

Lowe, D., "Object Recognition from Local Scale-Invariant Features," Proceedings of the International Conference on Computer Vision 2, Sep. 1999, pp. 1150-1157.

Lu, S., et al., "Video Summarization by Video Structure Analysis and Graph Optimization," IEEE International Conference on Multimedia and Expo (ICME), Jun. 2004, 4 pgs.

Ma, Y., et al., "A User Attention Model for Video Summarization," Dec. 2002, 10 pgs.

Mallat, S., et al., "Matching Pursuit with Time-Frequency Dictionaries," IEEE Transactions on Signal Processing, Dec. 1993, pp. 3397-3415.

Ng, A., et al., "On Spectral Clustering: Analysis and an Algorithm," Advances in Neural Information Processing Systems (NIPS), vol. 14, 2002, 8 pgs.

Ngo, C., et al., "Video Summarization and Scene Detection by Graph Modeling," IEEE TCASVT, vol. 15, No. 2, Feb. 2005, pp. 296-305.

Orriols, X., et al., "An EM Algorithm for Video Summarization, Generative Model Approach," Proceedings International Conference on Computer Vision, vol. 2, Jul. 2001, pp. 335-342.

(56) References Cited

OTHER PUBLICATIONS

Peeters, G., "A Large Set of Audio Features for Sound Description (similarity and classification) in the CUIDADO Project," http://www.ircam.fr, Apr. 2004, 25 pgs.

Peker, K., et al., "Adaptive Fast Playback-Based Video Skimming Using a Compressed-Domain Visual Complexity Measure," IEEE ICME, Jun. 2004, 10 pgs.

Ren, R., et al., "Attention Guided Football Video Content Recommendation on Mobile Devices," ACM International Conference on Mobile Multimedia Communications, 2006, 7 pgs.

Simakov, D., et al., "Summarizing Visual Data Using Bi-Directional Similarity," CVPR, Jun. 2008, 8 pgs.

Smith, M., et al., "Video Skimming and Characterization through the Combination of Image and Language Understanding," IEEE CVPR, Jun. 1997, 10 pgs.

Sundaram, H., et al., "A Utility Framework for the Automatic Generation of Audio-Visual Skims," ACM Multimedia, Dec. 2000, 10 pgs.

\* cited by examiner

| | |
|---|---|
| $t$ | frame index : $t = 1...N$ |
| $N$ | total number of frames in the sequence |
| $k$ | shot index : $k = 1...K$ |
| $K$ | total number of shots in the sequence |
| $l$ | concept index : $l = 1...L$ |
| $L$ | total number of concepts learned for the sequence |
| $W$ | video frame width |
| $H$ | video frame height |
| $F_t$ | frame $t$ |
| $SM_t$ | saliency map of frame $t$ |
| $Sal_t^v$ | visual saliency measurement for frame $t$ |
| $Sal_t^a$ | audio saliency measurement for frame $t$ |
| $Sal_t$ | audio-visual saliency measurement for frame $t$ |
| $Shot_k$ | shot $k$ |
| $t_k$ | the key-frame index of shot $k$ |
| $N_k$ | total number of frames in shot $k$ |
| $AvgSal_k^v$ | average visual saliency of shot $k$ |
| $AvgSal_k^a$ | average audio saliency of shot $k$ |
| $AvgSal_k$ | average audio-visual saliency of shot $k$ |
| $AR_t$ | active region on frame $t$ |
| $C_l$ | concept $l$ |
| $I_l$ | importance of concept $l$ |
| $d_k$ | audio-visual concepts mismatch flag |
| $\lambda$ | weighing parameter to balance the audio-visual saliency |
| $\alpha$ | saliency penalty for audio-visual concepts mismatch |

*FIG. 12*

VIDEO SKIMMING METHODS AND SYSTEMS

This is a continuation application of U.S. patent application Ser. No. 13/103,810, filed on May 9, 2011, entitled "Video Skimming Methods and Systems," and claims the benefit of U.S. Provisional Application No. 61/371,458, filed on Aug. 6, 2010, entitled "Video Skimming Methods and Systems," which application is hereby incorporated herein by reference in its entirety.

TECHNICAL FIELD

The present invention relates to image processing, and, in particular embodiments, to video skimming using of hierarchical audio-visual reconstruction with saliency-masked Bag-of-Words features.

BACKGROUND

The fast evolution of digital video has brought many new applications and consequently, research and development of new technologies, which will lower the costs of video archiving, cataloging and indexing, as well as improve the efficiency, usability and accessibility of stored videos are greatly needed. Among all possible research areas, one important topic is how to enable a quick browse of a large collection of video data and how to achieve efficient content access and representation.

To address these issues, video abstraction techniques have emerged and have been attracting more research interest in recent years. There are two types of video abstraction: video summary and video skimming. Video summary, also called a still abstract, is a set of salient images selected or reconstructed from an original video sequence.

Video skimming, also called a moving abstract, is a collection of image sequences along with the corresponding audios from an original video sequence. Video skimming is also called a preview of an original video, and can be classified into two sub-types: highlight and summary sequence. A highlight contains the most interesting and attractive parts of a video, while a summary sequence renders the impression of the content of an entire video. Among all types of video abstractions, summary sequence conveys the highest semantic meaning of the content of an original video.

One prior art method is uniform sampling the frames to shrink the video size while losing the audio part, which is similar to the fast forward function seen in many in digital video players. Time compression methods can compress audio and video at the same time to synchronize them, using frame dropping and audio sampling. However, the compression ratio can be limited by speech distortion in some cases. Frame-level skimming mainly relies on the user attention model to compute a saliency curve, but this method is weak in keeping the video structure, especially for a long video. Shot clustering is a middle-level method in video abstraction, but its readability is mostly ignored. Semantic level skimming is a method trying to understand the video content, but can be difficult to realize its goal due to the "semantic gap" puzzle.

SUMMARY OF THE INVENTION

In accordance with an embodiment, a method of creating a skimming preview of a video includes electronically receiving a plurality of video shots, analyzing each frame in a video shot from the plurality of video shots, where analyzing includes determining a saliency of each frame of the video shot. The method also includes determining a key frame of the video shot based on the saliency of each frame the video shot, extracting visual features from the key frame, performing shot clustering of the plurality of video shots to determine concept patterns based on the visual features, and generating a reconstruction reference tree based on the shot clustering. The reconstruction reference tree includes video shots categorized according to each concept pattern.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 12 provides an appendix listing notations used herein.

DETAILED DESCRIPTION OF ILLUSTRATIVE EMBODIMENTS

Figure 1:
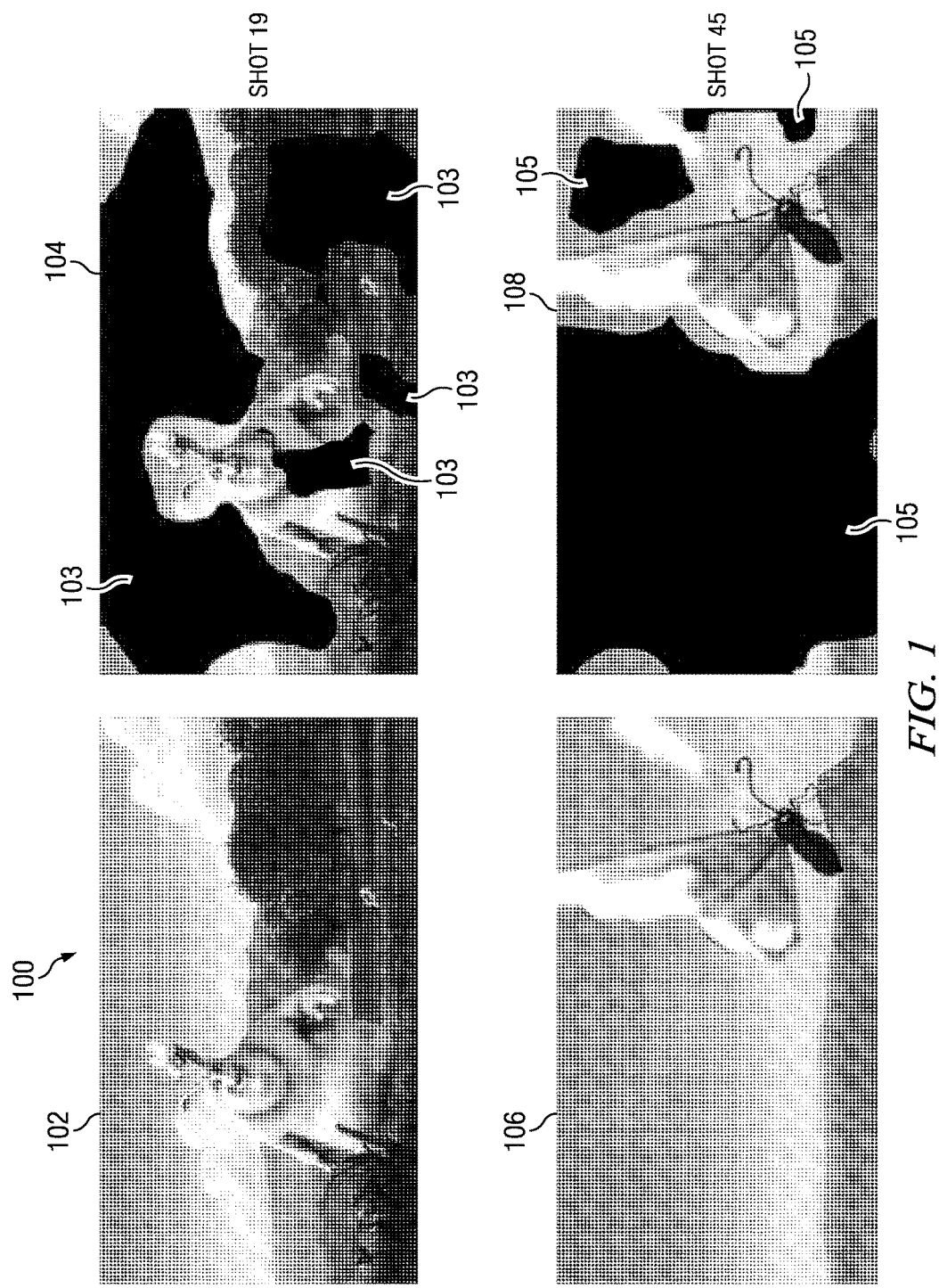
FIG. 1 provides frame shots illustrating embodiment visual saliency masking.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A novel approach to video summarization is disclosed. This approach includes unsupervised learning of original video concepts and hierarchical (both frame and shot levels) reconstruction.

Video skimming is a task that shortens video into a temporally condensed version by which viewers may still understand the plot of original video. This technique allows viewers to quickly browse of a large multimedia library and thus facilitates tasks such as fast video browsing, video indexing and retrieval. The performance of video summarization mainly lies in the following three aspects: skeleton preservation, exciting and interesting summarization and smooth transition.

Video summarization enables viewers to quickly and efficiently grasp what a video describes or presents from a shorter summarized version. To meet this need, the main skeleton from the original video is extracted and kept it in the summarized video. A video skeleton can be seen as a queue of concept patterns with certain semantic implications in a temporal order. The term "Concept pattern" here is not a high-level as real semantic concept that is learned by human intervention. Rather, a concept pattern encodes semantic meanings of shots (sets of consecutive similar video frames), symbolizes a shot group that portraits consistent semantic settings, and generally possesses the capability as a hallmark or self-evident clue that hints to the development of the original video. Viewers may possibly recover the plot by only watching and hearing a handful of shots as long as all concept patterns are conveyed.

Some embodiments of the present invention present to viewers an exciting interesting summary of video. Often in a video, there are various shots conveying the same concept patterns. When selecting one shot conveying a concept pattern from many, the one with high saliency value or equivalently generating the largest stimulus to human attention would be favored so that the resultant summarized video not only contains integral concept patterns, but also carefully selects shot instances with richest information to reflect these concept patterns. Hence, a plain or even dull summarization is avoided.

In some cases, an unnatural transition between two adjacent concept patterns due to the elimination of a number of visually and acoustically similar shots is apparent in conventional video skimming previews. Some embodiments of the present invention provide a smooth transition between adjacent concept patterns by providing additional frame level summarization.

Embodiments of the present invention generate video summarization by providing unsupervised learning of original video concepts and hierarchical (both frame and shot levels) reconstruction. In an embodiment, the skeleton of original video is analyzed by concept pattern mining. Viewing it as a clustering problem, Bag of Words features (SIFT based visual word and Matching-pursuit based audio word) are extracted for each shot from both visual and audio sensory channels that filtered with saliency masking. The Bag of Words features are then clustered into several groups using spectral clustering techniques. Each cluster represents a certain concept pattern.

Next, based on the discovered concept patterns, the original video is summarized from reconstruction point of view based on the learned concept pattern. In some embodiments, summarization is regarded as a "summation" process rather than a "subtraction" process. Keeping at least one shot for each concept pattern, the concept pattern integrity of summarized video offer viewers the capability of context recovery. In addition, given a specified skimming ratio, a video that also contains maximum achievable saliency accumulation is generated. In some embodiments, the summarization process is conducted in an iterative fashion, allowing flexible control of summarized video information richness vs. skimming ratio.

Finally, to meet the skimming ratio specification and keep the smooth transition in the summarized video, a frame level saliency thresholding is used, which is followed by a temporally morphological operation as post processing.

A good understanding of video content can help achieve a good video summary. The most common contents for a typical video sequence are visual and acoustic channels. Most of the time, visual signals provide the majority information from which latent concept patterns are learned from original video. However, audio sensory channels can also provide important information regarding concept pattern in ways not offered by the visual channel, for example, in low light environments and nighttime shots. Furthermore, in embodiments, a concept pattern can be derived that also shares both visual and audio consistency at the same time. Thus, if independent feature extraction and unsupervised concept learning from both visual and audio sensory data is used, learned concept results can be jointly analyzed in a parity-check fashion to enhance co-reliability. Therefore, in some embodiments, an audio stream is extracted from raw video and processed in parallel with the video stream to detect possible audio concepts.

In an embodiment, temporal segmentation for video stream is archived using shot detection. A variance-difference based approach is used to detect a shot change, and robustly detects scene cuts and fades between scenes. The variance of a frame is calculated and the delta variance with its previous frame Dvar is recoded. In an embodiment, the criteria for Dvar to start a new shot are:

a. Dvar (current)<Th1 (stability requirement)

b. maxDvar(start to current)−minDvar(start to current)>Th2 (tolerance requirement)

c. Frame number in current shot>Th3 (shot length requirement)

In alternative embodiments, other techniques can be used. For example, shot boundaries can also be found using color histogram based approaches or optical-flow motion features. For processing convenience, in some embodiments, audio data are segmented into pieces, where each piece has its boundaries synchronized to its co-located video shot in time axis.

In an embodiment, an attention model and a bag-of-words feature construction on shots is performed. Skeleton preservation uses some distinctive feature for shot-discrimination, and an exciting summarization uses a content attentiveness (saliency) measurement. Embodiment saliency measurement methods effectively reflect how informative a shot is, and shot features are selected to represent video skeleton with discrimination (i.e., to be used to find the similarity with other shots).

In embodiments, Bag-of-Words (BoW) models are used to characterize the shot properties in visual and aural domains, respectively. The Bag-of-Words (BoW) model was initially utilized in Natural Language Processing to represent the structure of a text. For, example, a BoW model regards a text document as a collection of certain words belonging to a reference dictionary but ignores the order and semantic implications of words. A BoW model uses the occurrence of each word in the dictionary as the feature of text, and therefore, often produces a sparse vector. The BoW model can be regarded as the "histogram representation based on independent features." As such, a shot can be regarded as a sort of "text document" with regard to some embodiments. However, since neither the "visual word" nor the "aural word" in a shot is readily apparent like real words in a text document, such visual and aural "words" need to be defined. In an embodiment, the determination of a "word" usually involves two steps: feature extraction and codeword generation.

In an embodiment, visual words are derived using saliency detection according to PQFT-based attention modeling. Such an attention model has been shown to be successful in imitating human's perceptual properties on video frames. The generated saliency map is used as a good indicator of how conspicuous a frame is, and which part within the frame incurs the highest human attention. Given the saliency map for each frame, a measure of visual frame-saliency is formulated by calculating the average value of the saliency map for a frame t:

$$Sal_t^v = \frac{1}{W \times H} \sum_{i=1}^{W} \sum_{j=1}^{H} WM_t(i, j),$$

where W and H are frame width and height respectively, SM refers to the saliency map for frame t.

For a shot, the visual conspicuous level is calculated by averaging the visual frame saliency in that shot:

$$AvgSal_k^v = \left\{ \frac{1}{N_k} \sum_t Sal_t^v | F_t \in Shot_k \right\}$$

In an embodiment, the visual structure of original video observed from a middle-level video concept pattern is derived. In general, a video concept pattern can be viewed as a self-learned set featured by a combination of certain Spatially Local Visual Atom (SLVA) and each SLVA stands for a single visual pattern, which is found within a localized neighborhood at a particular spatial location, with plausible semantic implications, like green grass, blue sky, etc. A noticeable property of the video concept pattern is that, importance is only attached to the occurrence of SLVAs, without esteeming the order (spatial location). For example, a shot of a far view of green hills with blooming yellow flowers and a shot of a near view of the grass and flowers should both imply the same concept, even though the grass and flowers may appear in different locations and in different scales. As such, the BoW model for visual shots, which graciously expresses the order-irrelevant property, is employed by embodiment of the present invention using SLVAs as the visual words. Alternatively, other techniques, such as part-based methods, referred in B Leibe, A Leonardis, and B Schiele, "Robust Object Detection with Interleaved Categorization and Segmentation", IJCV Special Issue on Learning for Vision and Vision for Learning, August 2007, can be used.

In an embodiment, a SIFT (Scale-invariant feature transform) feature extraction algorithm is used to obtain the video words, since because the SIFT effectively exhibits local characteristics within a neighborhood, with high matching accuracies under different scale, orientation, affine distortion, and is partially invariant to illumination changes. Details of SIFT are discussed in David G. Lowe, "Object recognition from local scale-invariant features," by, Proceedings of the International Conference on Computer Vision 2. pp. 1150-1157 (1999), which is incorporated herein by reference. Alternatively, other algorithms, such as Herbert Bay, Andreas Ess, Tinne Tuytelaars, Luc Van Gool, "SURF: Speeded Up Robust Features", Computer Vision and Image Understanding (CVIU), Vol. 110, No. 3, pp. 346-359, 2008, can be used.

In a regular full process mode, SIFT feature points are generally detected on every frame in the shot and on every region within a frame. This procedure, although precise, is especially time-consuming. Thus, some embodiments employ pre-processing steps prior to SIFT feature detection. In an embodiment key frames are used to balance computational cost and accuracy. Further, a filtering process called saliency masking is used to improve the robustness and efficiency of the SIFT feature extraction in some embodiments.

Considering the fact that some frames within a shot appear to have minor differences, one frame, referred to as a key frame, is selected as the most representative frame in a shot. There are many key frame selection methods known in the art that can be used. Some straightforward methods include choosing the first/last frame, or the middle frame in a shot. Some motion-based approaches use motion intensity to guide the key frame selection, such as those used in MEPG-7. In an embodiments, however, human attention models are used, and a most salient frame is used to represent a shot as follows:

$$t_k = \arg \max \{Sal_t^v | F_t \in Shot_k\}$$

Embodiment key frame selection techniques can save a large amount of computation resources at a minor cost of precision loss, assuming that frames are similar within a shot. If such an assumption does not hold, the attention model can be exploited with respect to a single frame to exclude some inattentive regions on the key frame. An embodiment attention model, based on image phase spectrum and motion residue is used to imitate human perceptual properties. In an embodiment, a saliency map SM is generated whose pixel value indicates how attentive the pixel on original frame is.

The movement of the camera through an environment, e.g., a fixed background is the ego-motion. In an embodiment, the impact of ego-motion is incorporated in determining the saliency of a frame. As described further in detail, this is accomplished by computing a motion channel having a difference in intensity map and an ego-motion compensated intensity map.

In an embodiment, the camera motion between adjacent frames is. Camera motion between two adjacent frames can be computed by estimating a 2-D rigid transformation based on the corresponding KLT (Kanade-Lucas-Tomasi Feature Tracker) key point tracks on the two adjacent frames. Embodiments of the invention also include alternative methods such as SIFT matching or Speeded Up Robust Features (SURF) correspondence etc.

Suppose a KLT key point is located at (x,y) in frame t, the corresponding KLT key point is tracked at (x',y') in frame (t+1), and the transformation from (x,y) to (x',y') can be expressed as follows:

$$\begin{bmatrix} x' \\ y' \end{bmatrix} = A \begin{bmatrix} x \\ y \end{bmatrix} + b = \begin{bmatrix} s\cos\theta & s\sin\theta \\ -s\sin\theta & s\cos\theta \end{bmatrix} \begin{bmatrix} x \\ y \end{bmatrix} + \begin{bmatrix} b_x \\ b_y \end{bmatrix}.$$

In the above equation, s, θ, b, and $b_y$ are camera parameters, wherein s is the zooming factor, θ is the counterclockwise rotation degree, $b_x$ corresponds to the pan movement, and $b_y$ corresponds to the tilt movement.

For a set of KLT key point correspondences, matrix A and vector b may be solved using the robust RANSAC (RANdom SAmple Consensus) rigid transformation estimation, which is a known iterative method to estimate parameters of a mathematical model from a set of observed data having outliers. RANSAC is a non-deterministic algorithm in the sense that it produces a reasonable result only with a certain probability, which increases with the number of allowed iterations. Embodiments of the invention may also use alternative methods such as Least Median of Squares or M-Estimator etc.

After estimating the camera motion parameters, the visual saliency of each frame may be determined. The camera motion may be applied to compensate the ego motion and the residual may be fused into the color information to generate visual saliency.

Next, the intensity channel I(t) of a frame t is calculated using the color channels of the frame as follows. A given frame t may comprise red r(t), green g(t), and blue b(t) channels. Four broadly tuned color channels may be generated by the following equations:

$$R(t)=r(t)-(g(t)+b(t))/2$$

$$G(t)=g(t)-(r(t)+b(t))/2$$

$$B(t)=b(t)-(r(t)+g(t))/2$$

$$Y(t)=(r(t)+g(t))/2-|r(t)-g(t)|/2-b(t).$$

In addition, two color difference channels are defined as following.

$$RG(t)=R(t)-G(t)$$

$$BY(t)=B(t)-Y(t).$$

The intensity channel is calculated as follows:

$$I(t)=(r(t)+g(t)+b(t))/3.$$

The ego-motion compensated intensity map I(t−τ) for the previous frame (t−τ) is computed. The motion channel M(t) is computed as an absolute difference between intensity map I(t) and ego-motion compensated intensity map I(t−τ) as follows:

$$M(t)=|I(t)-(A_{t-\tau}{}^t I(t-\tau)+b_{t-\tau}{}^t)|.$$

In the above equation, $A_{t-\tau}{}^t$ and $b_{t-\tau}{}^t$ are the estimated camera parameters from frame (t−τ) to frame t.

Next, the frame t can be represented as a quaternion image q(t):

$$q(t)=M(t)+RG(t)\mu_1+BY(t)\mu_2+I(t)\mu_3.$$

In the above equation, $\mu_j^2=-1$, j=1, 2, 3; and $\mu_1\perp\mu_2$, $\mu_1\perp\mu_3$, $\mu_2\perp\mu_3$, $\mu_3=\mu_1\mu_2$. Furthermore, q(t) can be represented in symplectic form as follows:

$$q(t)=f_1(t)+f_2(t)\mu_2$$

$$f_1(t)=M(t)+RG(t)\mu_1$$

$$f_2(t)=BY(t)I(t)\mu_1.$$

A Quaternion Fourier Transform (QFT) is performed on the quaternion image q(n,m,t), where (n,m) is the location of each pixel in time domain:

$$Q[u,v] = F_1[u,v] + F_2[u,v]\mu_2$$

$$F_i[u,v] = \frac{1}{\sqrt{MN}} \sum_{m=0}^{M-1} \sum_{n=0}^{N-1} e^{-\mu_1 2\pi((mv/M)+(nu/N))} f_i(n,m).$$

In the above equations, (u,v) is the location of each pixel in frequency domain, while N and M are the image's height and width.

The inverse Fourier transform is obtained as follows:

$$f_i[n,m] = \frac{1}{\sqrt{MN}} \sum_{m=0}^{M-1} \sum_{n=0}^{N-1} e^{\mu_1 2\pi((mv/M)+(nu/N))} F_i[u,v].$$

A Frequency domain representation Q(t) of the quaternion image q(t) can be rewritten in the polar form as follows:

$$Q(t)=\|Q(t)\|e^{\mu\Phi(t)},$$

where ΦW is the phase spectrum of Q(t).

In equation 20, if $\|Q(t)\|=1$, the frequency domain representation Q(t) of the quaternion image q(t) includes only the phase spectrum in frequency domain. Therefore, the inverse Quaternion Fourier Transform (IQFT) of the phase spectrum of the frequency domain representation Q(t) of the quaternion image q(t) may be performed. The IQFT of the phase spectrum q'(t) is a 2-D image map and may be computed as follows:

$$q'(t)=a(t)+b(t)\mu_1+c(t)\mu_2+d(t)\mu_3.$$

The saliency map (sM(t)) of frame t may be obtained by taking a smoothing filter kernel and running a convolution with the 2-D image map q'(t):

$$sM(t)=g*\|q'(t)\|^2,$$

where g is a 2-D Gaussian smoothing filter. In various embodiments, for computation efficiency, only the Phase Spectrum of Quaternion Fourier Transform (PQFT) on a resized image (e.g., whose width equals to 128) may be computed.

Next, the visual saliency value $S_v(t)$ of the frame t may be computed by taking the average over the entire saliency map as follows:

$$S_v(t) = \frac{1}{MN} \sum_{m=0}^{M-1} \sum_{n=0}^{N-1} sM(n,m,t).$$

Embodiments of the invention for tuning the saliency to account for camera motion will next be described. Camera motion may be utilized to emphasize or neglect certain objects. Alternatively, camera motion may be used to guide viewers' attentions during a scene.

In one or more embodiments, the rigid motion estimation as described above, may be used to determine the camera motion type and speed. However, further information is required to understand the relationship between camera motion and the significance of a particular camera motion in guiding a user. For example, it is necessary to be able to map the computed camera parameters to their ability to attract a viewer's attention. Embodiments of the invention use general camera work rules to set up a user attention based model.

The user attention based model is obtained based on the following assumptions from general movie production. First, zooming is assumed to emphasize something. In particular, the speed of zooming scales linearly with the importance of the media segment. Therefore, faster zooming speeds describe important content. Usually, zoom-in is used to emphasize details, while zoom-out is used to emphasize an overview scene. Second, a video producer may apply panning if the video producer wants to neglect or de-emphasize something. As in zooming, the speed of the panning operation may be used a metric of importance. Unlike zooming, the faster the panning speed is, the less important the content is.

The visual saliency value $S_v(t)$ of frame t is then scaled by the corresponding camera attention factor $\omega_{cm}(t)$. Therefore, the effective visual saliency $S_v^*(t)$ is computed as:

$$S_v^*(t) \leftarrow \omega_{cm}(t) \cdot S_v(t).$$

In various embodiments, an attention factor $\omega_{cm}$ caused by camera motion is quantified over a pre-determined range, for example, [0~2]. For example, a value greater than 1 may represent emphasis, while a value smaller than 1 may represent neglect.

Next, an active region on the key frame is defined by thresholding the saliency map:

$$AR_{t_k}(i,j) = \{F_{t_k}(i,j) | SM_{t_k}(i,j) > T, 1 \le i \le W, 1 \le j \le H\}$$

where, T is the active threshold. The SIFT feature detection in remaining active regions then generates prominent and robust SLVAs of the frame.

FIG. 1 illustrates the results of saliency masking on shot 19 and 45 of a frame sequence. For example, frame 102 represents shot 19 prior to the application of saliency masking, and frame 104 represents shot 19 after saliency masking has been applied. Regions 103 represent the masked regions of shot 19. Similarly, frame 106 represents shot 45 prior to the application of saliency masking, and frame 108 represents shot 45 after saliency masking has been applied. Regions 105 represent the masked regions of shot 45.

Figure 2:
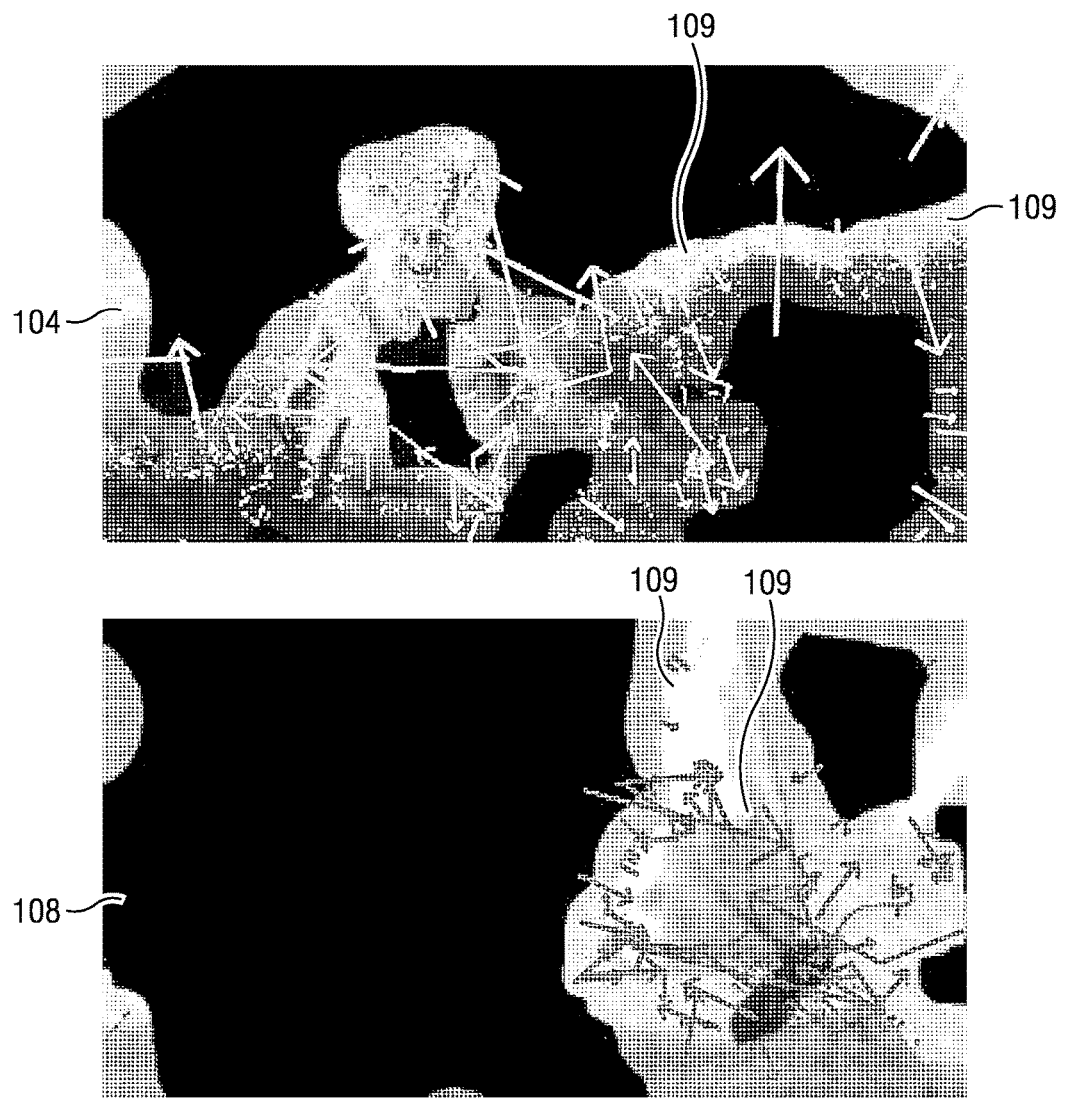
FIG. 2 illustrates embodiment SIFT features in active regions on video frames.

In an embodiment, Lowe's algorithm for SIFT feature detection in active regions on the key frame is used. The frame is convolved with Gaussian filters at different scales, and then the differences of successive Gaussian-blurred versions are taken. Key points are located as maxima/minima of the Difference of Gaussians (DoG) that occur at multiple scales. Then, low-contrast key points are discarded and high edge responses are eliminated. Next, each key point is assigned one or more orientations based on the local gradient directions. Finally, a highly distinctive 128-dimension vector is generated as the point descriptor; i. e., the SLVA. For example, FIG. 2 shows detected SIFT feature points 109 in frames 104 and 108 representing shots 19 and 45, respectively.

After SIFT feature points are found on the key frame of each shot, the shot as a bag has a collection of "visual-word," with each is a vector of dimension 128. The number of words is the number of SIFT feature point s on the key frame. A shot bag with its SIFT feature descriptors can now be regarded as a text document that has many words. In order to generate the histogram representation as the feature for the shot, "dictionary" is built as the collection of all the "words" from all the bags, and similar "words" should be treat as one "codeword," as in text documents, "take", "takes", "taken" and "took" should be regarded same— "take", as its codeword. The bags of words in visual appearance are referred to in L. Fei-Fei and P. Perona, "A Bayesian Hierarchical Model for Learning Natural Scene Categories," by IEEE Computer Vision and Pattern Recognition. pp. 524-531, 2005, which is incorporated herein by reference. Alternatively, other algorithms can be used, such as, but not limited to those described in G. Csurka, C. Dance, L. X. Fan, J. Willamowski, and C. Bray. "Visual categorization with bags of keypoints". Proc. of ECCV International Workshop on Statistical Learning in Computer Vision, 2004, can be used. Furthermore, other vector dimensions can be used as well.

A codeword can be considered as a representative of several similar SLVAs. In an embodiment, K-means clustering over all the SLVAs is used, where the number of the clusters is the codebook size. Such an embodiment can be viewed as being analogous to the number of different words in a text dictionary. Here, codewords are the centers of the clusters, and each "word" is mapped to a certain codeword through the clustering process.

Figure 3:
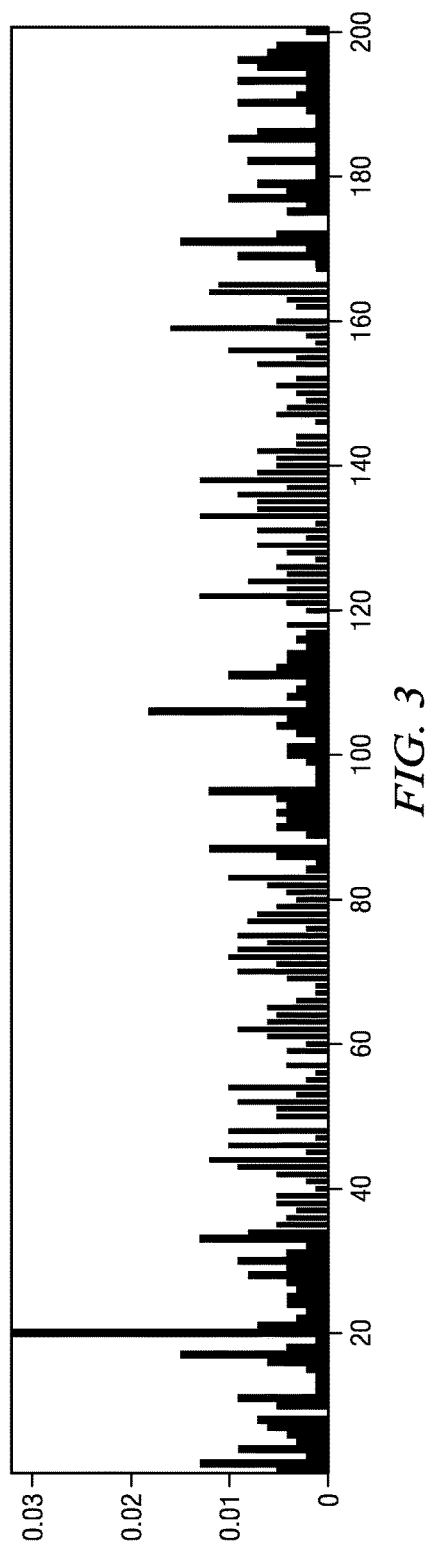
FIG. 3 provides a graph to illustrating an embodiment BoW feature for example video frames.

Thus, each shot can be represented by a histogram of the codewords. In one example, to take into account the complexity of a particular video sequence, 200 codewords are used. FIG. 3 depicts the visual BoW feature for 19, frame 104 shown in FIGS. 1 and 2 above. Here, the x-axis represents the index of words, and the y-axis represents the normalized frequency of words occurred in the key frame of the shot.

Figure 4:
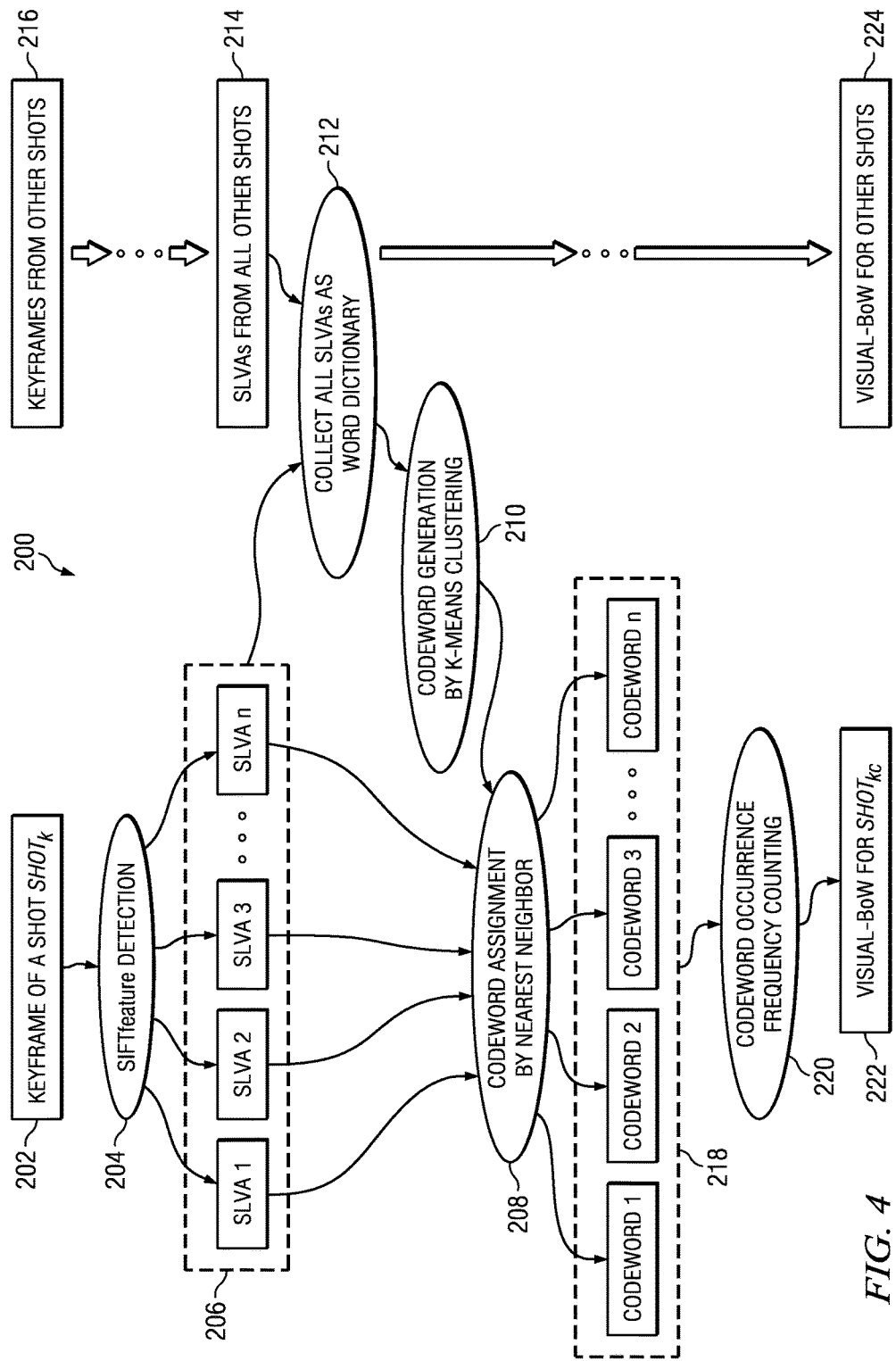
FIG. 4 provides a flow chart of an embodiment visual BoW feature extraction.

FIG. 4 illustrates flowchart 200 of an embodiment visual BoW feature extraction for a shot. Key frame 202 of $SHOT_k$ is input to SIFT feature detection block 204, which applies SIFT feature detection to $SHOT_k$. Each detected SLVA 206 is assigned a codeword in step 208 based on codeword generation by K-means clustering block 210. The frequency of each determined codeword 218 is counted in step 220 to produce visual BoW 222 for $SHOT_k$. Codeword generation by K-means clustering block 210 generates codewords based on all SLVAs (block 212) found among the key frame of $SHOT_k$ 202, as well as and key frames 216 and SLVAs 214 from other shots. Visual BoWs 224 for other shots are similarly derived.

In an embodiment, the audio structure of the original video is observed with respect to an audio concept pattern. In general, an audio concept pattern is interpreted as acoustic environment featured by a combination of certain Temporally Local Acoustic Atom (TLAA). Each TLAA stands for a single audio pattern with plausible semantic implications. For example, an audio concept conversation between John and Mary at the shore is featured as a combination of John's short time voice (a TLAA) switching with Mary's (a TLAA) and continuous environmental sound of sea wave (a TLAA). Note that for the purpose of video summarization, an audio skeleton is sought that are usually comprised of "self-contained" concept patterns, meaning that in the set of shots that form a concept pattern, every shot has TLAAs from the same closed subset of plausible audio patterns and the reshuffling of plausible audio patterns is allowed. This assumption originates from the fact that humans recognize an audio scene from a macroscopic perspective, which emphasizes the components instead of an exact time and location of every component.

As in the above example, if another audio scene also includes John, Mary and the sea wave, but this time John continuously talks during the first half and Mary talks during the second half, without any voice switching, this scene is still considered to have the same concept pattern as the example above. Here, the second example also conveys the semantic implication of John Mary's conversation at the shore. With respect to one audio concept, those shots are subject to consistent TLAA compositions, regardless of which order these TLAAs are arranged.

In the context of audio concept clustering, at this level, the feature vectors of different shots may be much closer to each other, as long as their acoustic component TLAAs are alike. In some embodiments, they are then pruned to be clustered into the same group, which captures the underlying common characteristics of an audio scene. Compared to many indicator-like features, which identifies a shot as a single acoustic source, for example, speech from a single person, sound from a machine or environment, and background music, each shot will end up to be a sparse vector with only one 1-entry that indicates to which acoustic source this shot belongs. While this hard-decision-like feature can be viewed as contradictory to the fact that an audio segment corresponding to a shot usually consists of multiple intervening sources, this fact is implicitly reflected by a BoW feature.

For indicator-like features, the sparse nature of their shot data highlights the difference of shot data by assuming shot as a single source with majority contribution, which are usually different. In this way, the clustering may lose much opportunity to learn a reasonable concept pattern where shots have similar acoustic components, but the majority of sources are different. Therefore, embodiment BoW features encode intervening sources of a concept softly, which provides a closer approximation to the nature of an underlying concept as perceived by humans, and thus yields more accuracy.

To serve the needs of concept pattern mining that focuses on components rather than their order, the BoW model can suitably represent the audio features of a detected shot. If the audio stream of a shot is chopped into multiple overlapped short-time audio segments with equal length, the shot can be regarded as a bag containing multiple audio segments as audio words. Each word, with extracted feature by Matching Pursuit decomposition, represents a unique TLAA, which is an audio pattern with plausible semantic implications. A shot is consequently considered as a bag containing the audio patterns. The histogram of each word occurrence is a summarized feature of a shot through all the words within. Here, an encoding theme is applied to avoid the over-sparsity of feature vectors (negatively impact the classification result) from a direct word occurrence statistic. In an embodiment, all audio words from all shots in raw video are stored into a dictionary, and K-means clustering is conducted over the dictionary to produce K codewords. Each word is then assigned to a nearest codeword. The BoW feature of each shot is the occurrence of codewords inside the shot.

In an embodiment, the robustness of an audio BoW feature is improved by taking into account audio words above an acoustic saliency level to avoid the negative effect on the BoW accuracy exerted by audio words of low saliency. This can be due to its small value compared with noise. Here, audio saliency is measured by a variety of low-level audio features (scalar values), including Spectral Centroid, Root Mean Square (RMS), Absolute Value Maximum, Zero-Crossing Ratio (ZCR), and Spectral Flux. By using saliency masking, the audio words experience a reliability test so that the accuracy of features for every word is increased.

Figure 5:
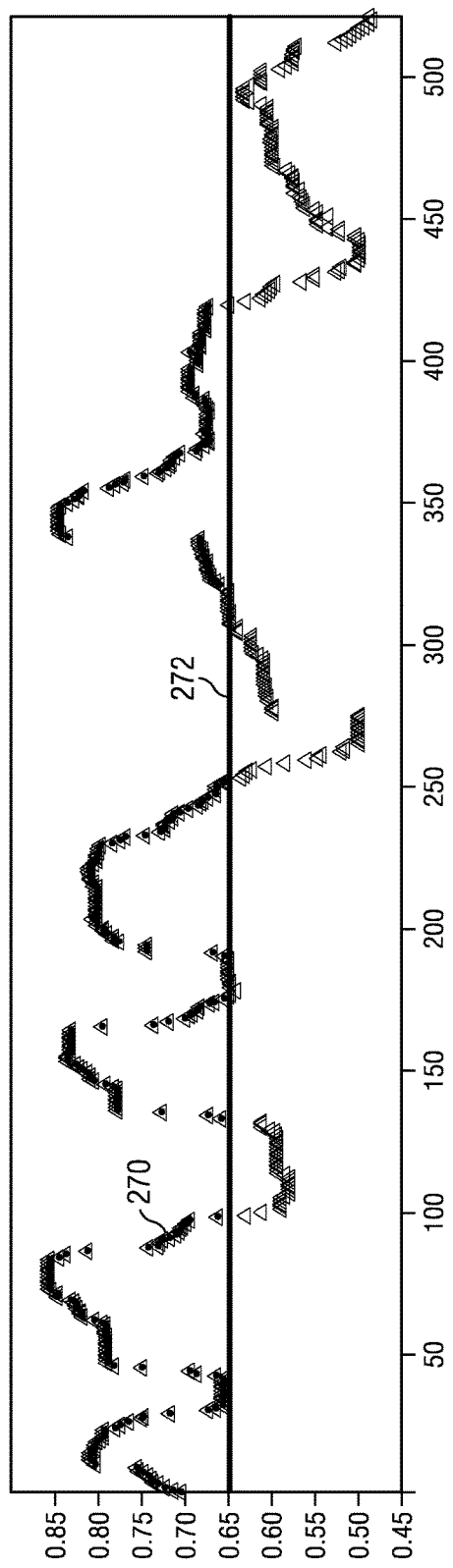
FIG. 5 illustrates an embodiment saliency masking of audio words.

The spectral centroid is the center of the spectrum of the signal, and is computed by considering the spectrum as a distribution whose values are the frequencies, and the probabilities to observe these are the normalized amplitude. Root mean square is a measure of short time energy of a signal from norm 2. Absolute Value Maximum is a measure of short time energy of a signal from norm 1. The zero-crossing is a measure of the number of time the signal value cross the zero axis. These measures are further discussed by G. Peeters. "A large set of audio features for sound description (similarity and classification) in the CUIDADO project," 2003. ircam.fr/anasyn/peeters/ARTICLES/Peeters_2003_cuidadoaudiofeatures.pdf), which is incorporated herein by reference. FIG. 5 illustrates an example graph showing how threshold 272 is applied to audio saliency 270 for audio word extraction. Here, the x-axis represents the discrete time instant for an audio segment, and the y-axis represents the audio signal amplitude at the given time instant.

FIG. 5 illustrates saliency masking of audio words. Within a shot, only a certain amount of short-time audio segments masked from the whole audio signal of the shot are sparsely decomposed by MP to form BoW feature. These segments are chosen if their low-level feature is above a threshold. For example, audio saliency 270 above threshold 272 are chosen in an embodiment.

To perform feature extraction for words, a matching pursuit (MP) based histogram method is used to decompose the audio segment corresponding to a word into a series of predefined waveform bases. In an embodiment, MP can feature ambient sounds and other unstructured sounds, and can access information to enhance the awareness of a latent concept pattern in addition to featuring structured sounds. Alternatively, other acoustic feature algorithms such as MFCC, LPCC are available for recognition purpose are available, and can be used, for example, with structured audio streams, such as music or speech.

In an embodiment, an audio word is considered as a short-time audio segment with a certain length that produces one single TLAA. Its unique acoustic characteristics can be encoded by a set of base functions in a reference dictionary and corresponding correlation coefficients. Using MP, an efficient sparse representation can be made of the audio segment. In one embodiment, MP decomposition is performed in an iterative fashion: at each step, a basis of a given dictionary is selected by maximizing the energy removed from the residual signal the iteration continues until the maximum number of loop or, equivalently, the number of basis used to reconstruct signal is reached. Thus, MP ensures the resultant sparse representation the most efficient in the sense that the reconstructed signal based on the selected basis takes up a larger percentage than any other decomposition method. Discussion of MP techniques can also be found in S. G. Mallat and Z. Zhang, "Matching Pursuits with Time-Frequency Dictionaries," IEEE Transactions on Signal Processing, December 1993, pp. 3397-3415, which is incorporated herein by reference.

In an embodiment, a Gabor dictionary with Gabor waveform basis is adopted. Each particular Gabor waveform is indexed by its scale, frequency and translation from origin as in the following Gabor function definition. MP is one type of greedy algorithm: starting from the original audio signal, each basis in the Gabor dictionary is paired with the signal to calculate their correlation coefficients. Then the basis with the largest coefficients is chosen because it is most similar with the signal among all bases. Then, a residual signal is calculated as the difference of original signal from the reconstructed signal by the chosen basis. In the next iteration, the same operations are applied except for the original signal is replaced by the residual signal and the Gabor dictionary is the one with the chosen basis in its last iteration removed. The process stops until the number of iterations reaches the maximum number specified.

The Gabor function is defined by:

$$g_{s,\mu,\omega,\theta}(n) = \frac{K_{s,\mu,\omega,\theta}}{\sqrt{s}} \exp^{-\pi(n-\mu)^2/s^2} \cos[2\pi\omega(n-\mu) + \theta],$$

where s, μ, ω, θ are scale, translation, frequency and initial phase respectively.

In one embodiment, the bases in Gabor dictionary all have 256-point length. To encode a short-time audio segment as a TLAA vector by MP decomposition, the length of the short-time audio segment is made to be 256-point, as well, to neatly align with the Gabor base function. Applying MP, a TLAA can be represented by a feature vector each entry of which symbolizes the coefficients of a selected Gabor basis. Alternatively, other point lengths can be used. Furthermore, in alternative embodiments, other basis can be used besides the Gabor basis, for example, the basis described in Remi Gribonval and Emmanuel Bacry, "Harmonic Decomposition of Audio Signals With Matching Pursuit," IEEE Transactions on Signal Processing, Vol. 51, No. 1, January 2003.

In an embodiment, the following MP algorithm is implemented:

```
Input:, Signal: f(t).
Output: List of coefficients: (a_n,g_γn)
Initialization:
   Rf_1 ← f(t)
Repeat
   g_γn ∈ D with maximum inner product (Rf_n,g_γn)
   a_n ← (Rf_n,g_γn)
   Rf_{n+1} ← Rf_n - a_n g_γn
   n ← n + 1
Until stop condition (for example: ||Rf_n|| < threshold).
```

Figure 6:
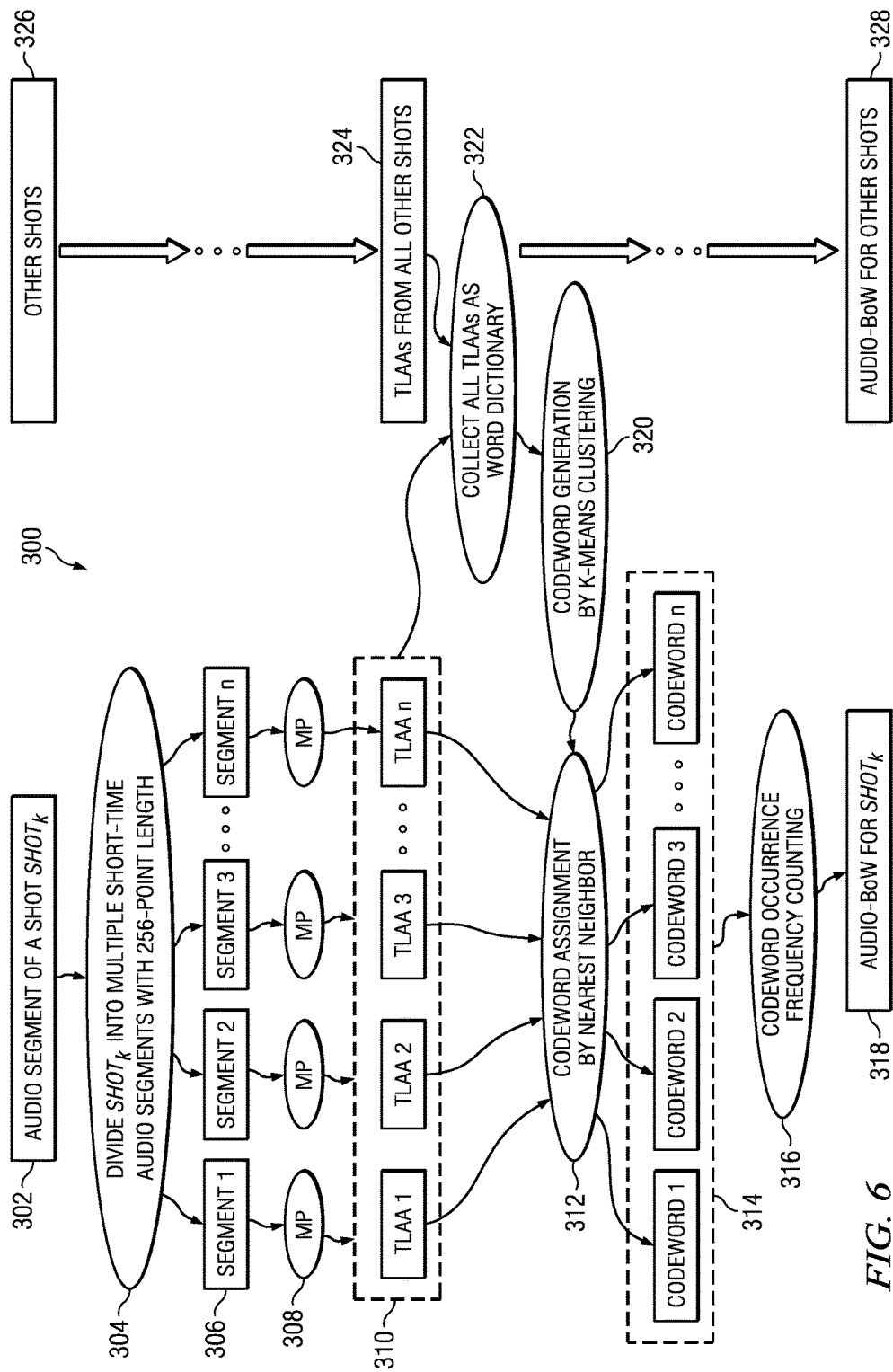
FIG. 6 illustrates a flow chart of audio BoW feature extraction.

FIG. 6 illustrates flowchart 300 of an embodiment audio MP-based BoW identification method. Audio segment 302 of SHOT$_k$ is divided into multiple short-time segments 306 in step 304, from which MP representation 308 is derived from each segment 306. Next, MP representations 308 are encoded as TLAA vectors 310. Codewords 314 are assigned in step 312. The frequency of each codeword 314 is counted in step 316 to produce audio-BoW 318 for each shot. Codeword generation by K-means clustering block 320 generates codewords based on all TLAAs (block 322) found among TLAAs 310, as well as TLAAs 324 from other shots 326. Audio BoWs 328 from other shots are similarly derived.

Figure 7:
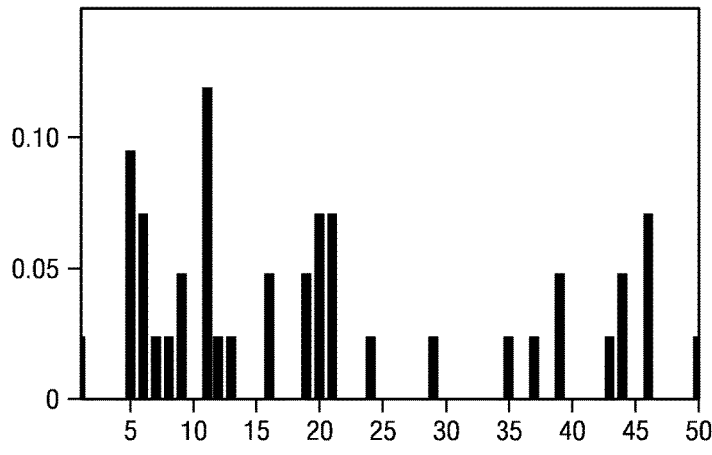
FIG. 7 illustrates the an example graph of an audio BoW feature.

FIG. 7 illustrates an embodiment audio descriptor of the shot derived from bags of audio words where the number of words K=50. In this graph, the x-axis represents the index of audio words and the y-axis represents the normalized frequency for each word.

In an embodiment, spectral clustering is used for concept pattern learning. In the following portion of this disclosure, the term "concept" will be used to abbreviate the term "concept pattern."

With the feature vector available for each shot under both visual and audio sensory channels, shots in original video are ready for clustering to discover the latent concepts. Visual and audio sensory channels are processed independently so that they can provide mutual reliability to each other.

In an embodiment, a clustering method first groups data correctly, even though the numbers of data in different clusters are different. A spectral clustering method is used to learn possible concepts from shots. Given shot feature data, spectral clustering provides a state-of-the-art classification approach.

In an embodiment, spectral clustering minimizes an objective function that cancels out the negative effect due to imbalanced division of number of members in different clusters. Even though original video contain concept patterns that consist of significantly different number of shot members, embodiment spectral clustering methods can be made free of artificial bias of a division of uniform number of members and can dividing them correctly as long as the feature measure makes the shots in the same concept consistent.

By the virtue of spectral clustering, latent concepts are independent from the number allocation of shot members in different clusters. Meanwhile, due to the favor of locally-connected data into a single cluster, the learned concept tends to be self-contained, which is desirable to represent a video skeleton. The algorithm of spectral clustering is as follows, which is discussed in A. Y. Ng, M. I. Jordan, and Y. Weiss. On spectral clustering: Analysis and an algorithm. *Advances in Neural Information Processing Systems (NIPS)* 14, 2002, incorporated herein by reference.

Normalized spectral clustering according to Ng, Jordan. and Weiss (2002)
Input: Similarity matrix $S \in \mathbb{R}^{n \times n}$, number k of clusters to construct.
   Construct a similarity graph by one of the ways described in Section 2.
   Let W be its weighted adjacency matrix.
   Compute the normalized Laplacian $L_{sym}$.
   Compute the first k eigenvectors $u_1,...,u_k$ of $L_{sym}$.
   Let $U \in \mathbb{R}^{n \times b}$ be the matrix containing the vectors $u_1,...,u_k$ as columns.
   Form the matrix $T \in \mathbb{R}^{n \times k}$ from U by normalizing the rows to norm 1, that is set $t_{ij} = u_{ij}/(\Sigma_k u_{jk}^2)^{1/2}$.
   For i = 1,...,n, let $y_i \in \mathbb{R}^k$ be the Vector corresponding to the i-th row of T.
   Cluster the points $(y_i)$i=1,...,n with the k-means algorithm into clusters $C_1,...,C_k$.
Output: Clusters $A_1,...,A_k$ with $A_i = \{j | y_j \in C_i\}$.

After spectral clustering for both visual and audio sensory channels, the shots are grouped into different visual and audio concepts. Note that for a scene with both aural and visual content that conveys a certain concept, its visual layer and audio layer may comprise physically different carriers, but present the same semantic implications for the same concept. Therefore, there is a mapping from the learned visual concepts to audio concepts.

In an embodiment, a number-of-member based method is used to align visual and audio concept indexes. Since a visual concept with its audio counterpart reflects a single concept with semantic implications, the number of shot members in this concept would reveal the identity of the concept. This number-of-member is feasible also because spectral clustering imposes no such artificial effects to evenly divide data to clusters.

A bimodal concept alignment algorithm is as follows: calculate the number of member shots for each video concept and audio concept; then sort the video concept and audio concept separately according to the number of member shots by descending order; afterwards, the visual concept is aligned with audio concept with the same rank. When sorting, if there are different concepts with exact number of member shots, these concepts are sorted according to their average occurrence time signature (i.e. the average starting time of member shots of each concept).

In an embodiment, a bimodal concept alignment algorithm can be expressed as follows:

```
Input: visual concept index for each shot (e.g. 132324222412311)
       audio concept index for each shot (e.g. 413132333243144)
Output: the registration map between visual and audio concept
Count the number of members for each visual concept and each audio
concept. (e.g. for visual concept:
    Concept 1: 4 occurrences
    Concept 2: 6 occurrences
    Concept 3: 3 occurrences
    Concept 4: 2 occurrences
    for audio concept:
    Concept 1: 3 occurrences
    Concept 2: 2 occurrences
    Concept 3: 6 occurrences
    Concept 4: 4 occurrences)
Sort visual and audio concept in descending order by the number of
members (e.g. visual concept:
    concept 2 > concept 1 > concept 3 > concept 4
audio concept:
    concept 3 > concept 4 > concept 1> concept 2)
Output the map
(e.g. visual     audio
    concept 2 <-> concept 3
    concept 1 <-> concept 4
    concept 3 <-> concept 1
    concept 4 <-> concept 2
```

If the numbers of members of more than one concept are equal, then match ambiguity emerges in the one-to-one mapping between visual and audio concepts. Here the time signature of shot member is used as alternative feature to bind two concept sets. A concept pair producing more similar time signature on both sides are considered as a good pair and are matched up. The time signature is the starting/ending time and duration of a shot.

In an embodiment, an algorithm is used to progressively generate a summarized video clip by the means of collecting shots. In other words, a video skimming process is regarded as a video reconstruction process. Starting from an empty output sequence, a shot is recruited each time to the output sequence until the target skimming ratio is achieved. The duration of the output video is thus controlled by recruiting different amounts of video shots to satisfy arbitrary skimming ratio. The recruiting order plays an important role in the final result.

As discussed hereinabove, all the three aspects in video skimming are considered: efficiency, saliency, and smoothness. Given the requirements, we design several rules and propose a "reconstruction reference tree" structure for our skimming algorithm:

To maintain concept integrity, some embodiments require that each concept contributes shots to the skimmed video. By having each concept contribute shots to the skimmed video, the skimmed video reflects the diversity of concepts of the original video and, thus yields the maximum entropy, even though some concepts may seem not salient. In some embodiments, it is possible to have less salient shots added into the video skimming preview as a way of trading of concept integrity and saliency maximization.

In embodiments, the concept importance is used as a factor for deciding the recruiting order of different concept patterns. It is not equivalent to the concept saliency. Rather, concept importance is a more high-level argument that can reveal a video producer's intention for the concepts' representation. Most commonly, if the producer gives a long shot for a concept pattern, or repeats the concept in many shots, then this concept can be considered to be of high importance intentionally. Under this assumption, the concept importance can be expressed as:

$$I_l = \{\Sigma N_k | Shot_k \in C_l\},$$

where $N_k$ is the total number of frames in shot k within concept l. In an embodiment reconstruction framework, a shot is first picked from the most important concept.

To increase or maximize saliency, in some embodiments, every shot is assigned an average audio-visual saliency value to indicate how exciting this shot is to viewers. Some shots, however, have mismatched audio-visual concepts. For example, a video of two people, A and B are talking; most shots will consistently show the person's figure and play the person's voice. Some shots will show A's figure while play B's voice. The case is rare but possible, and we call it a mismatch. After the concept registration, the mismatch can be easily found by comparing the registered spectral clustering results.

$$d_k = \begin{cases} 1, & \text{visual and audio concept mismatch for shot } k \\ 0, & \text{visual and audio concept match for shot } k. \end{cases}$$

When there is a mismatch, the audio-visual saliency of the shot is decreased in some embodiments, since recruiting such a shot may cause some misunderstanding to viewers. The audio-visual saliency is reduced according to the following expression:

$$AvgSal_k = \lambda AvgSal_k^v + (1-\lambda)AvgSal_k^a$$

$$AvgSal_k = AvgSal_k - \alpha d_k,$$

where $\lambda$ is weighing parameters to balance audio-visual saliency and $\alpha$ is saliency penalty for audio-visual concepts mismatch.

The most salient shot in each concept is defined as a "must-in" shot, which means that, these shots are recruited in the skimmed video in spite of the skimming ratio. This helps guarantee concept integrity. The other shots are "optional" shots in the sense that they can be recruited or not depending on the target skimming ratio.

The reconstruction reference tree (RRT) is a tree structure for video reconstruction guidance. According to embodiments, the RRT is built according embodiments principles regarding concept integrity, concept importance, shot saliency penalty for audio-visual concept mismatch and "must-in" shots and optional shots for each concept.

In an embodiment, the root of the RRT is the video concept space, which is the learned through the spectral clustering process. The first level leaves are the concepts, which are sorted in importance descending order from left to right, and the second level leaves are the shots. Under each concept, the shots are sorted in saliency descending order from top to bottom.

The first child of each concept is the "must-in shot" and the rest of the shots are optional shots. Since each concept may have different number of shots, some "virtual shots" with zero saliency are included to form an array of all shots. The resulting array is called the shot table.

Figure 8:
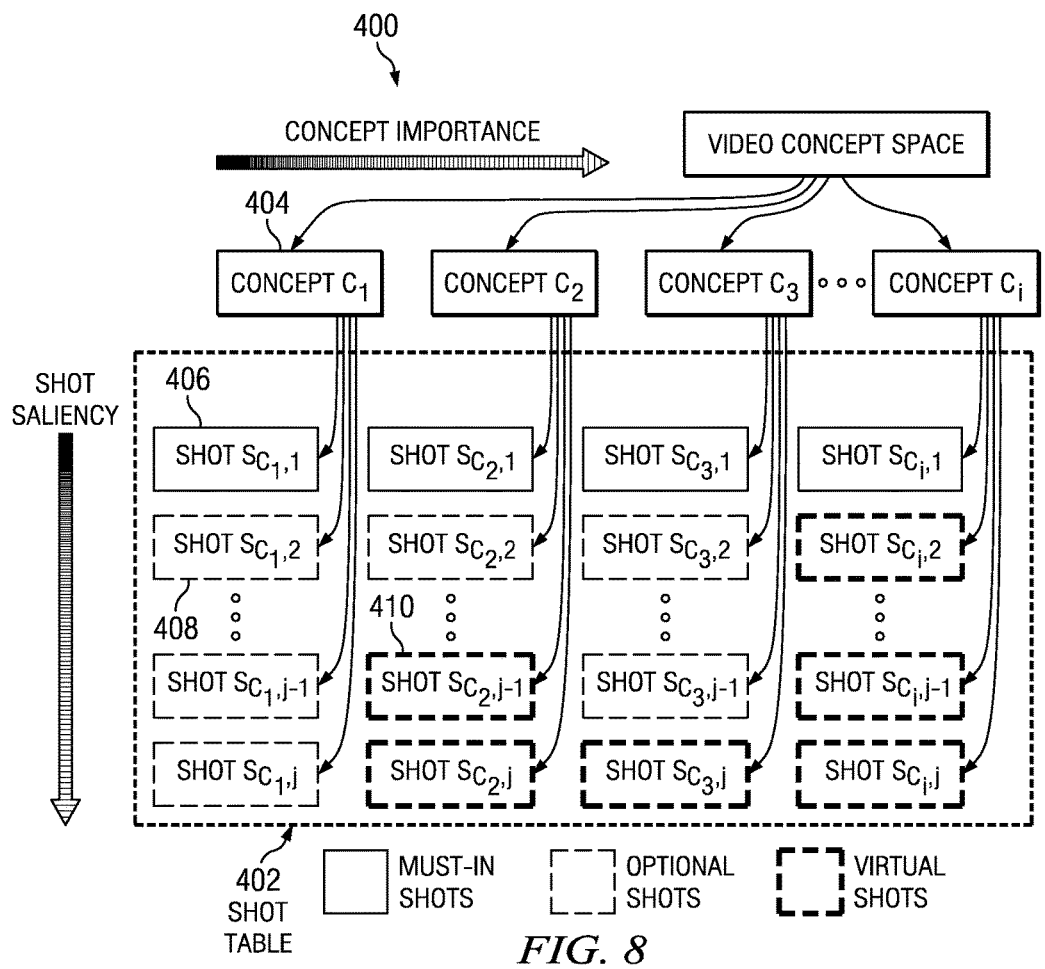
FIG. 8 illustrates an embodiment reconstruction reference tree and shot table.

Turning to FIG. 8, embodiment RRT 400 is illustrated. Shot table 402 has shots ordered according to concept 404 and shot saliency. In an embodiment, concept categories 404 are ordered according to concept importance. Similarly, shots within each category are ordered according to saliency, such that the more salient shots are ordered at the top of each concept category and the least salient shots are ordered toward the bottom of each concept category. In an embodiment, ordered shots within each category can include must-in shots 406, optional shots 408 and virtual shots 410 as described above.

Given the RRT and shot table, the reconstruction process is relatively straightforward. The following describes an embodiment reconstruction algorithm:

---
ALGORITHM 1 (Reconstruction)
---

Input: RRT, Target skimming ratio $R_t$
Output: skimmed video $V_{im}$, Current skimming ratio $R_c$
Initialization: skimmed video = Empty;
   Current skimming ratio $R_c = 0$;
Begin:
   Recruit a shot (must-in or optional, skip the virtual shots) in the shot table in raster scan order.
      Update $R_c$;
      If $R_c \geq R_t$ and all must-in shots are recruited
         Stop;
      Else   Loop;
End

---

As the reconstruction is based on shots, the current skimming ratio $R_c$ may not perfectly equal to the target skimming ratio. In some embodiments, it may be more likely that $R_c$ is slightly larger than $R_t$ (due to the stop criteria). In order to precisely control the output video duration, pure frame-level skimming, which is based on the attention model, is used as post processing. The audio-visual saliency of a frame as is computed as:

$$Sal_t = \lambda Sal_t^v + (1-\lambda) Sal_t^a.$$

The audio-visual saliency of every frame that appears in the output sequence is checked again. By thresholding on the saliency curve, frames with relatively low saliency are discarded, thereby allowing the final duration of the output video satisfy the target duration. In addition, the smoothness requirement is also considered to yield a viewer-friendly skimmed video. A morphological smoothing operation is adopted which includes deleting curve segments that are too short than K frames, and joining together curve segments that are less than K frames apart. In some embodiment, K is generally a small number, for example, 10 frames. Alternatively, other numbers can be used for K. The post processing algorithm is described as follows:

---
ALGORITHM 2 (post processing)
---

Input: $V_{im}$, $R_c$, $R_t$
Output: final skimmed video $V_o$
Initialization: saliency curve formation of $V_{im}$ using the user attention model calculate curve preserving ratio $R = R_t/R_c$
Begin:
   smooth the saliency curve using median filter
   calculate a threshold T such that R percent of curve are on top of the threshold.
   thresholding $V_{im}$ using T, do morphological smoothing and the remaining frames compose $V_o$
End.

---

Figure 9:
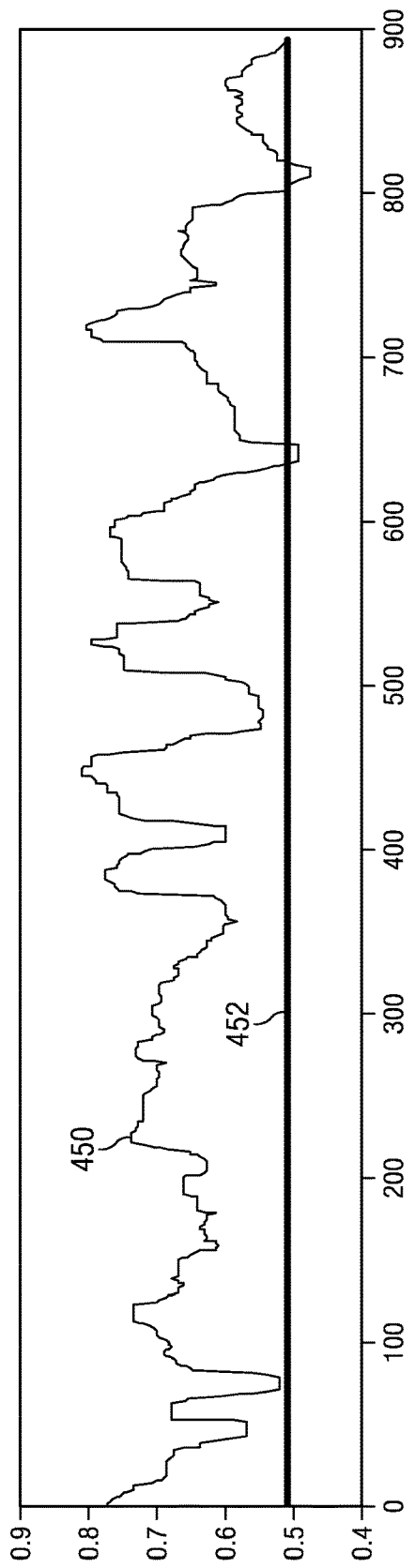
FIG. 9 illustrates an embodiment post processing saliency curve.

FIG. 9 illustrates an embodiment saliency curve 450 with threshold 452 to obtain a preserving ratio 95%. It should be appreciated that in alternative embodiments, other thresholds can be applied to obtain other threshold ratios.

Figure 10:
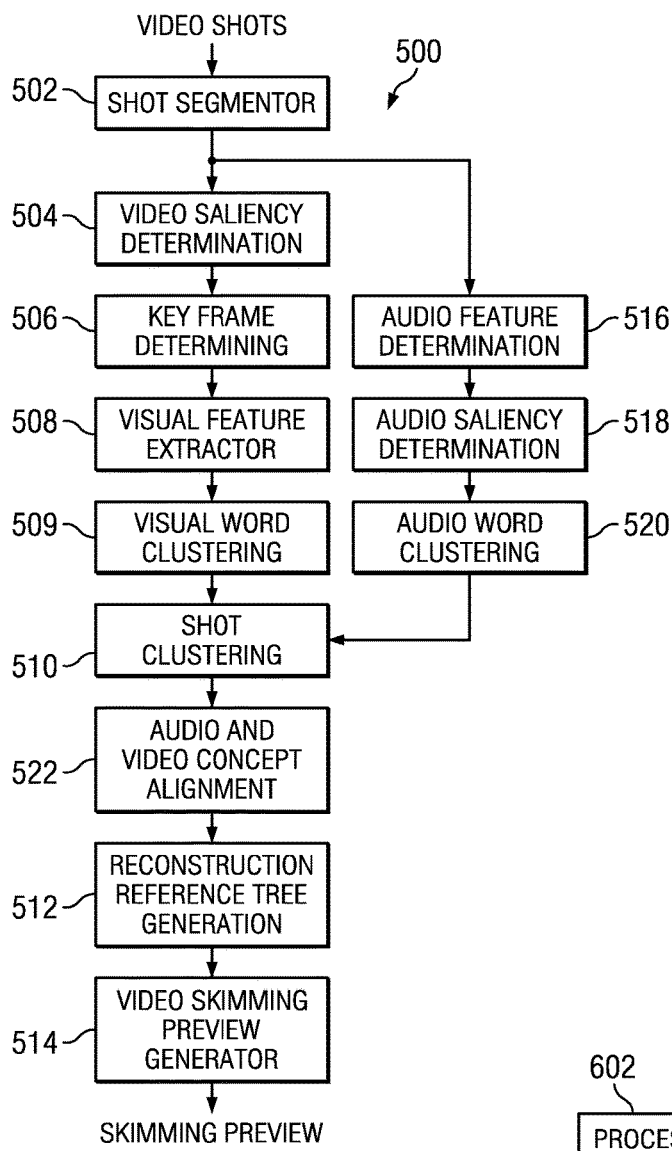
FIG. 10 illustrates and embodiment system that implements embodiment algorithms.

The generation of embodiment video skimming previews described hereinabove can be implemented in system 500 as shown in FIG. 10. Referring to that figured, shot segmentor 502 is configured to segment a video in to individual shots. The saliency of each shot is determined by video saliency determination block 504, the output of which, is used by key frame determining block 506 to determine a key frame from among each shot. Visual feature extractor block 508 is configured to extract visual features, and visual word clustering block 509 is configured to cluster visual words form visual concepts using methods described above. Shot clustering block 510 is configured to cluster shots based on different visual and audio descriptors to build concept patterns.

In an embodiment, audio feature determination block 516 is configured to determine audio features from each segmented shot, and audio saliency determination block 518 is configured to the saliency of each audio feature. Audio clustering is performed by audio word clustering block 520 to produce audio concepts. Furthermore, audio and visual concepts are aligned by block 522.

In an embodiment, reconstruction reference tree generation block 512 creates an RRT based on saliency and concept importance, according to embodiments described herein. Moreover, video skimming preview generator 514 is configured to generate the skimming preview.

Figure 11:
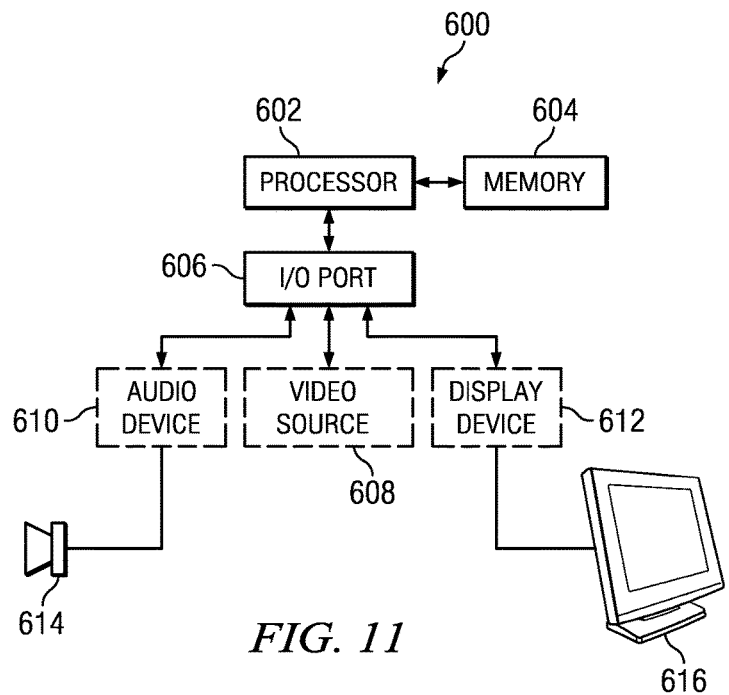
FIG. 11 illustrates a processing system that can be utilized to implement embodiment methods.

FIG. 11 illustrates a processing system 600 that can be utilized to implement methods of the present invention. In this case, the main processing is performed in by processor 602, which can be a microprocessor, digital signal processor or any other appropriate processing device. Program code (e.g., the code implementing the algorithms disclosed above) and data can be stored in memory 604. The memory can be local memory such as DRAM or mass storage such as a hard drive, optical drive or other storage (which may be local or remote). While the memory is illustrated functionally with a single block, it is understood that one or more hardware blocks can be used to implement this function.

In one embodiment, the processor can be used to implement various some or all of the units shown in FIG. 11. For example, the processor can serve as a specific functional unit at different times to implement the subtasks involved in performing the techniques of the present invention. Alternatively, different hardware blocks (e.g., the same as or different than the processor) can be used to perform different functions. In other embodiments, some subtasks are performed by the processor while others are performed using a separate circuitry.

FIG. 11 also illustrates I/O port 606, which can be used to provide the video to and from the processor. Video source 608, the destination of which is not explicitly shown, is illustrated in dashed lines to indicate that it is not necessary part of the system. For example, the source can be linked to the system by a network such as the Internet or by local interfaces (e.g., a USB or LAN interface). In some embodiments, display device 612 is coupled to I/O port 606 and supplies display 616, such as a CRT or flat-panel display with a video signal, and audio device 610 is coupled to I/O port 606 and drives acoustic transducer 614 with an audio signal. Alternatively, audio device 610 and display device 612 can be coupled via a computer network, cable television network, or other type of network. In a further embodiment, video skimming previews can be generated offline and included in portable media such as DVDs, flash drives, and other types of portable media.

FIG. 12 provides a listing of notations used herein.

As discussed above, the present application provides a number of new features including, but not limited to, using a hierarchical video summarization framework for arbitrary and accurate skimming ratio control with integrated concept preservation. Embodiments also include the ability to provide progressive video reconstruction from concept groups for high-level summarization, concept group categorization by spectral clustering of video shots, and alignment of audio concept groups with video concept groups. In some embodiments, visual and audio Bag-of-Words techniques are used for feature extraction, where visual words are constructed by using a SIFT (Scale-invariant feature transform), and audio words constructed by using Gabor-dictionary based Matching Pursuit (MP) techniques.

In embodiments, saliency masking is used to provide for robust and distinguishable Bag-of-Word feature extraction. In some embodiments, visual saliency curve shaping uses a PQFT+dominant motion contrast attention model, and audio saliency curve shaping is performed using by low-level audio features, such as Maximum Absolute Value, Spectrum Centroid, RMS, and ZCR. Furthermore, saliency-curve based skimming is used as a low level summarization.

An advantage of embodiments using spectral clustering is that spectral clustering favors the classification of locally-correlated data into one cluster because it adds another constraint to distinguish the close-located or locally-connected data and increase their similarity to be divided into one group. By this constraint, the clustering result approaches human intuition that a cluster with consistent members is generally subject to a concentrated distribution. A further advantage of spectral clustering is that the clustering result is not sensitive to the number of members in the clusters.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   electronically receiving a plurality of video shots;
   analyzing each frame in a video shot from the plurality of video shots, the analyzing comprising determining a saliency of each frame of the video shot, the saliency being a content attentiveness saliency providing a measurement of representative shot properties;
   determining an effective visual saliency based on the determined saliency, the effective visual saliency based on camera motion of the plurality of video shots and a human attention model of the video shot;
   selecting a key frame of the video shot based on the effective visual saliency of each frame of the video shot;
   extracting visual features from the key frame; performing shot clustering of the plurality of video shots to determine concept patterns based on the visual features; and
   generating a hierarchical reconstruction based on the shot clustering, the hierarchical reconstruction enabling a skimming preview of the video.

2. The method of claim 1, wherein the human attention model is based on camera motion.

3. The method of claim 2, wherein:
   the human attention model comprises a camera attenuation factor based on the camera motion;
   the method further comprises determining the camera attenuation factor; and
   determining the effective visual saliency comprises multiplying the determined effective visual saliency with the determined camera attenuation factor.

4. The method of claim 3, wherein the determined camera attenuation factor is proportional to a zooming speed of video shot from the plurality of video shots.

5. The method of claim 3, wherein the determined camera attenuation factor is inversely proportional to a panning speed of video shot from the plurality of video shots.

6. The method of claim 1, wherein the hierarchical reconstruction comprises a reconstruction reference tree that includes video shots categorized according to each concept pattern.

7. The method of claim 6, wherein generating the reconstruction reference tree comprises
   categorizing video shots within concept categories ordered according to concept importance, and
   ordering video shots within each concept category according to effective visual saliency.

8. The method of claim 7, further comprising determining the concept importance comprising determining a total number of frames in a shot having a same concept.

9. The method of claim 6, further comprising generating a video skimming preview based on the reconstruction reference tree.

10. The method of claim 1, further comprising extracting audio features from the video shot.

11. The method of claim 10, wherein extracting audio features comprises:
    determining audio words from the video shot; and
    performing clustering on the audio words.

12. The method of claim 11, further comprising:
    determining visual concept patterns based on the performing shot clustering; and
    determining audio concept patterns based on the performing clustering on the audio words.

13. The method of claim 12, further comprising:
    calculating a number of member shots for each visual concept of the visual concept patterns and for each audio concept of the audio concept patterns;
    sorting each visual concept by calculated number of shots;
    sorting each audio concept by calculated number of shots; and
    aligning visual concepts and audio concepts having a same number of shots.

14. A method of generating a skimming preview of a video, the method comprising:
    electronically receiving a reconstruction reference tree comprising video shots categorized within concept categories ordered according to concept importance, wherein video shots within each concept category is ordered according to saliency;
    selecting shots starting from categories of highest importance and shots of highest saliency within the categories of highest importance; and
    generating the skimming preview based on the selected shots.

15. The method of claim 14, further comprising:
    selecting frames within the selected shots having a highest saliency; and
    using the frames within the selected shots having the highest saliency to generate the skimming preview.

16. The method of claim 15, wherein selecting frames within the selected shots having a highest saliency comprises:
    selecting a target skimming ratio;
    determining a threshold according to the selected target skimming ratio; and
    comparing the saliency of the selected shots to the threshold.

17. The method of claim 16, wherein the selected target skimming ratio is an arbitrary length.

18. The method of claim 15, wherein the saliency comprises an effective visual saliency based on camera motion of the video shots.

19. A non-transitory computer readable medium with an executable program stored thereon, wherein the program instructs a microprocessor to perform the following steps:
analyzing each frame in a video shot from a plurality of video shots, analyzing comprising determining a saliency of each frame of the video shot, the saliency being a content attentiveness saliency providing a measurement of representative shot properties;
determining an effective visual saliency based on the determined saliency and based on camera motion of said each frame of the video shot;
selecting a key frame of the video shot based on the effective visual saliency of each frame of the video shot;
extracting visual features from the key frame;
performing shot clustering of the plurality of video shots to determine concept patterns based on the visual features; and
generate a reconstruction reference tree based on the shot clustering, the reconstruction reference tree comprising video shots categorized according to each concept pattern.

20. The non-transitory computer readable medium of claim 19, wherein the program instructs the microprocessor to further perform the steps of:
determining audio features of the video shot;
determining saliency of the determined audio features;
clustering the determined audio features; and
aligning audio concept and video concept categories.

21. The non-transitory computer readable medium of claim 19, wherein the program instructs the microprocessor to further perform the step of generating a skimming preview based on the reconstruction reference tree.

22. The non-transitory computer readable medium of claim 19, wherein the step of generating the reconstruction reference tree comprises categorizing video shots within concept categories ordered according to concept importance, and ordering video shots within each concept category according to the effective visual saliency.

23. The non-transitory computer readable medium of claim 19, wherein the program instructs the microprocessor to further perform the step of determining a camera attenuation factor; and
the step of determining the effective visual saliency comprises multiplying the determined saliency with the determined camera attenuation factor.

24. The non-transitory computer readable medium of claim 23, wherein:
the camera attenuation factor is proportional to a zooming speed of video shot from the plurality of video shots; and
the camera attenuation factor is inversely proportional to a panning speed of video shot from the plurality of video shots.

* * * * *